UNITED STATES PATENT OFFICE.

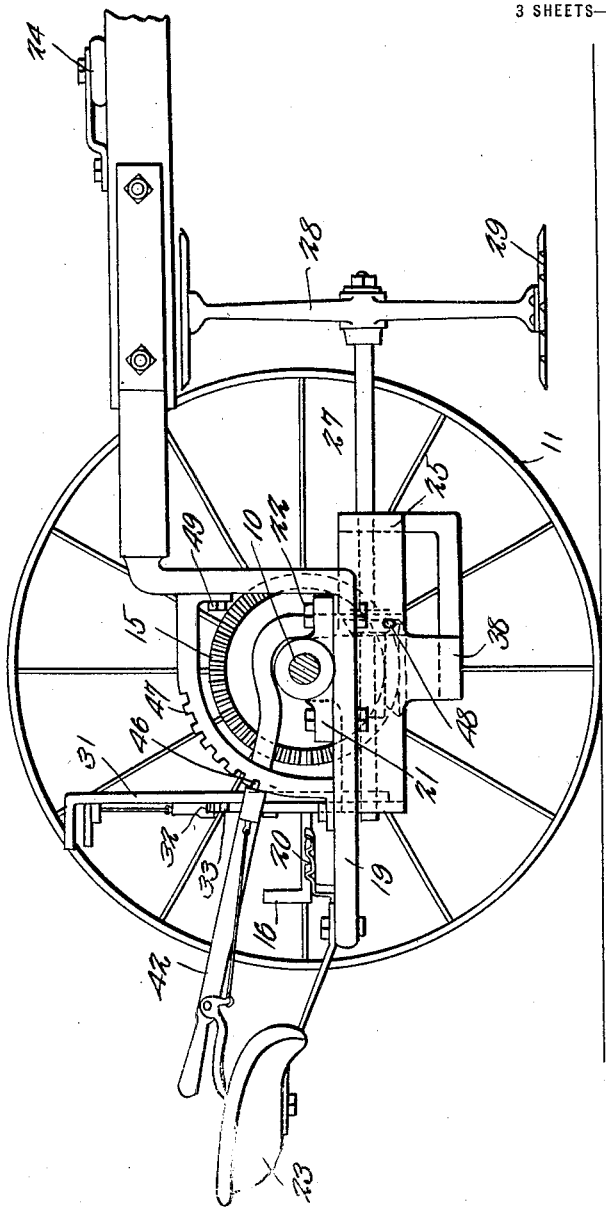

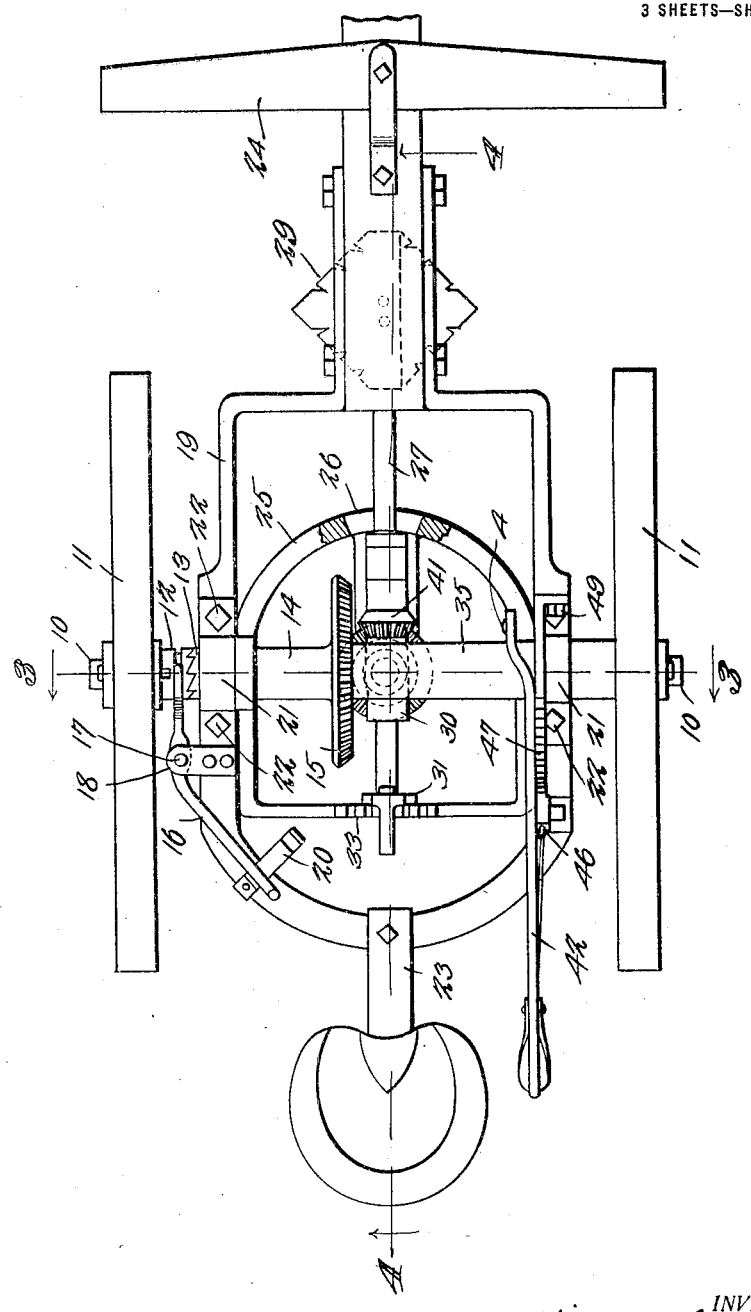

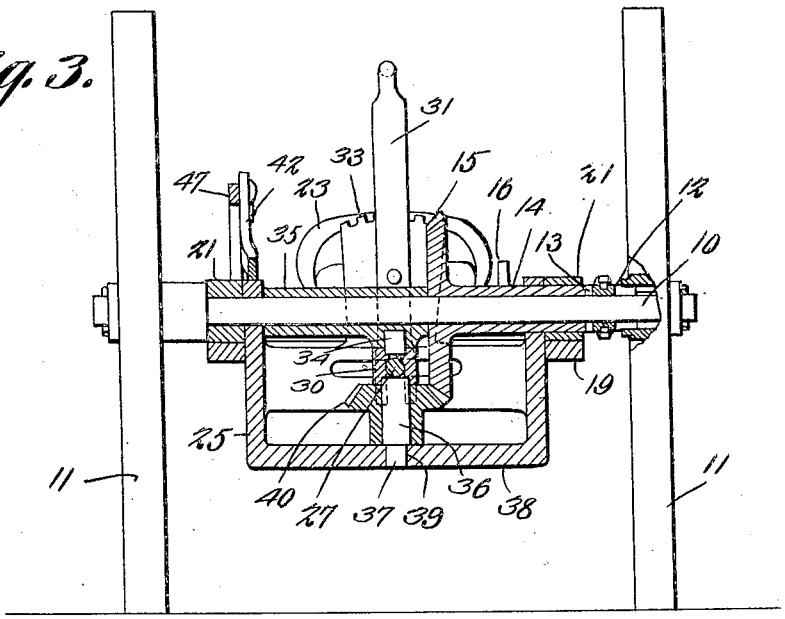
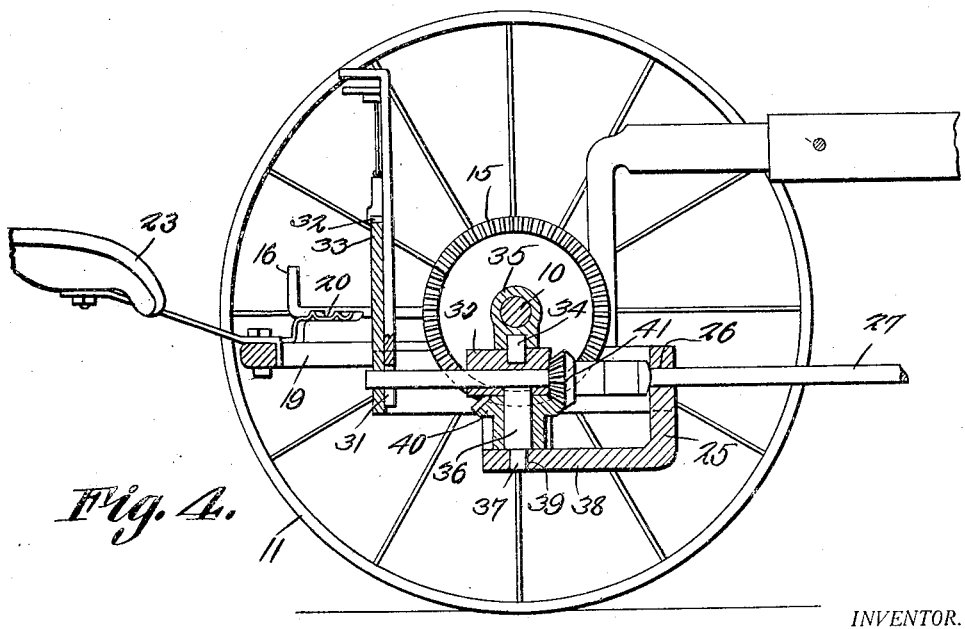

WILLIAM D. RAINEY, OF LOCKESBURG, ARKANSAS.

COTTON-CHOPPER.

1,354,131. Specification of Letters Patent. Patented Sept. 28, 1920.

Application filed August 19, 1919. Serial No. 318,449.

*To all whom it may concern:*

Be it known that I, WILLIAM D. RAINEY, a citizen of the United States of America, and resident of Lockesburg, in the county of Sevier and State of Arkansas, have invented certain new and useful Improvements in Cotton-Choppers, of which the following is a specification.

This invention relates to cotton choppers and particularly to means for rotatably supporting the chopper and for oscillatably mounting the same which is adjustable transversely of the rows of cotton stalks being cut.

An object of this invention is to provide a cotton chopper having novel means whereby the same is adjusted vertically while at the same time permitting lateral adjustment and a further object of this invention is to produce a cotton chopper having a frame for adjustably supporting the mechanism by which the aforementioned objects are attained.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a view in elevation of a cotton chopper, the main shaft being in section;

Fig. 2 illustrates a plan view of a cotton chopper embodying the invention;

Fig. 3 illustrates a sectional view on the line 3—3 of Fig. 2;

Fig. 4 illustrates a sectional view on the line 4—4 of Fig. 2.

In these drawings 10 denotes a shaft or axle having the ground or traction wheels 11 mounted on them so as to rotate said shaft. The shaft has a clutch member 12 splined on it so that it rotates as the shaft rotates. A clutch member 13 with which the clutch member 12 coacts is formed on a sleeve 14, which sleeve is rotatable on the shaft or axle 10 and the said sleeve carries a beveled gear wheel 15 which when the clutch members are in engagement is rotatable through the medium of the ground or traction wheel.

The clutch member 12 is moved into and out of operative relation with the clutch member 13 by a lever 16 oscillatable on a pivot 17 of the bracket 18 carried by the frame 19 and the lever is held at different positions of adjustment by being in engagement with a bracket 20 also carried by the frame 19.

The frame 19 is oscillatable on the axle or shaft 10 and is held thereon by members 21, such as clips, secured in place by fastenings 22, such as bolts.

The frame 19 has an operator's seat 23 connected to it and it is also supplied with suitable draft rigging 24 which is conventionally shown in Fig. 2.

A frame 25 is also oscillatably mounted with relation to the frame 19 and the said frame 25 has a transversely disposed slot 26 through which the chopper shaft 27 projects and in which it is rotatable and oscillatable. The said chopper shaft has a cross arm 28 attached to it and the said cross arm is supplied with chopper blades 29 intended to cut the cotton stalks.

The shaft 27 is journaled in a bearing 30 and extends rearwardly of the gear wheel 15 where it is engaged by a bifurcated lever 31 which holds the shaft at different positions of adjustment so that the cotton chopper blades will be held to the right or left hand side of the transverse center of the machine, this being for the purpose of making it possible to adjust the cotton chopper laterally as stated.

The lever 31 has a detent 32 which engages a rack 33 anchored to the frame 25 and thereby the chopper shaft 27 is held at different positions of adjustment.

In order to afford oscillatable movement of the chopper shaft, the bearing 30 has an upwardly extending trunnion pin 34 which is partially rotatable in a member 35 which embraces the shaft 10 and which is supported by said shaft. The bearing 30 has a downwardly extending shaft 36 and an extended trunnion pin 37 so that the said bearing 30 is oscillatable with relation to the frame 25, the said frame 25 having an arm 38 with an aperture 39 for the reception of the trunnion pin 37. The beveled gear wheel 40 is rotatable on the shaft 36 and meshes with the gear wheel 15 and is driven thereby. The pinion 40 meshes with a pinion 41 on the chopper shaft so that the chopper shaft is driven or rotated through the medium of the gear wheel 15 and the pinions 40 and 41.

The frame 25 is oscillatable with relation to and independently of the frame 19 and said frame 25 being under the control of an arm 42 which is rigidly connected to the said frame 25. The arm 42 is held in different positions of adjustment through the medium of the detent 46 which engages the teeth of the rack 47. The arm 42 is connected to the frame 25 by means of a fastening 48 such as a pin or the like.

The detent may be of any ordinary type but the conventional showing of a known type will suffice for an understanding of this feature. The toothed rack 47 is rigidly connected to the frame 19 by fastenings 49 such as screws or the like.

I claim

In a cotton chopper, a shaft having wheels, a gear wheel rotatably mounted on the shaft, means for communicating motion of the shaft to the gear wheel, a bearing for a chopper shaft, a member supported on the shaft and having a recess in its lower side, a trunnion pin projecting upwardly from the bearing and extending into the recess of the last mentioned member, a downwardly extending shaft on said bearing, an arm in which the last mentioned shaft is trunnioned, a frame carrying the arm, said frame being supported from the first mentioned shaft, a pinion mounted on the last mentioned shaft and meshing with the gear wheel, a chopper shaft journaled in its bearing and extending rearwardly thereof, a lever engaging the rearward extension for adjusting the shaft transversely of the frame, and a chopper head mounted on the forward end of the chopper shaft.

WILLIAM D. RAINEY.